US012683493B2

(12) United States Patent
Chien

(10) Patent No.: US 12,683,493 B2
(45) Date of Patent: Jul. 14, 2026

(54) LOW PASS FILTERED PHASE VOLTAGE TO IMPROVE TRANSIENT RESPONSE IN A BUCK CONVERTER

(71) Applicant: PowerX Semiconductor Corporation, Hsinchu County (TW)

(72) Inventor: Min Chu Chien, Hsinchu County (TW)

(73) Assignee: PowerX Semiconductor Corporation, Hsinchu County (TW)

( * ) Notice: Subject to any disclaimer, the term of this patent is extended or adjusted under 35 U.S.C. 154(b) by 194 days.

(21) Appl. No.: 18/661,728

(22) Filed: May 13, 2024

(65) Prior Publication Data

US 2025/0219535 A1     Jul. 3, 2025

(30) Foreign Application Priority Data

Dec. 29, 2023    (TW) ................................. 112151706

(51) Int. Cl.
*H02M 3/156*        (2006.01)
*H02M 1/00*         (2006.01)

(52) U.S. Cl.
CPC ......... *H02M 3/156* (2013.01); *H02M 1/0025* (2021.05); *H02M 3/1566* (2021.05)

(58) Field of Classification Search
CPC ......................................... H02M 3/155–1588
See application file for complete search history.

(56) References Cited

U.S. PATENT DOCUMENTS 8,816,661 B2    8/2014  Candage et al.
9,013,164 B1 *  4/2015  Lee ....................... H02M 3/156
                                                                    323/285

9,667,145 B1    5/2017  Goenawan et al.
2009/0140708 A1 *  6/2009  Tateishi .............. H02M 3/1588
                                                                    323/282
2015/0102794 A1    4/2015  Fan
2018/0248479 A1    8/2018  Fan et al.
2022/0038000 A1    2/2022  Shuvalov
2022/0294330 A1    9/2022  Huang et al.

FOREIGN PATENT DOCUMENTS

CN        101656473 A    2/2010
CN        103219868 A    7/2013
TW        200726049 A    7/2007
TW        201134072 A    10/2011
TW        1675537 B       10/2019
TW        M653794 U      4/2024

* cited by examiner

*Primary Examiner* — Peter M Novak
(74) *Attorney, Agent, or Firm* — CKC & Partners Co., LLC

(57)                ABSTRACT

The present disclosure provides a power convertor circuit and a control circuit thereof. The power convertor circuit converts an input voltage signal to output an output voltage signal and includes a power stage circuit and a control circuit. The control circuit generates a first ripple signal according to a phase voltage signal outputted by the power stage circuit, generates a second ripple signal according to a DC signal generated by processing the first ripple signal, a reference voltage signal and a feedback signal related to the output voltage signal, and controls the power stage circuit to operate according to a preset off time when the second ripple signal continuously transcends the first ripple signal, to increase an inductor current. The control circuit calibrates the reference voltage signal by a DC offset calibration circuit, to eliminate an offset between the reference voltage signal and the feedback signal.

19 Claims, 5 Drawing Sheets

LOW PASS FILTERED PHASE VOLTAGE TO IMPROVE TRANSIENT RESPONSE IN A BUCK CONVERTER

CROSS-REFERENCE TO RELATED APPLICATION

This application claims priority to Taiwan Application Serial Number 112151706, filed on Dec. 29, 2023, which is herein incorporated by reference in its entirety.

BACKGROUND

Field of Invention

This disclosure relates to a control circuit, in particular to a control circuit of a power convertor circuit.

Description of Related Art

With the development of semiconductor technology, the ability of the power convertor circuit to respond to the load fluctuation becomes more important. Some related arts would add a ramp signal related to the current on the reference voltage for increasing the loop stability. However, these related arts still have low speed of response to the load fluctuation, and easily cause offset problems in the reference voltage or the feedback voltage. Therefore, it is necessary to propose new circuits to solve the above problems.

SUMMARY

An aspect of present disclosure relates to a control circuit applicable to a power convertor circuit. The power convertor circuit includes a power stage circuit, and is configured to output an inductor current through an inductor. The control circuit includes a first ripple generation circuit, a signal processing circuit, a second ripple generation circuit and a comparison circuit. The first ripple generation circuit is coupled to a phase output terminal of the power stage circuit and configured to output a first ripple signal according to a phase voltage signal outputted by the power stage circuit. The signal processing circuit is coupled to the first ripple generation circuit and configured to process the first ripple signal to output a direct current (DC) signal. The second ripple generation circuit is coupled to the signal processing circuit and configured to output a second ripple signal according to the DC signal, a reference voltage signal and a feedback signal related to an output voltage signal of the power convertor circuit. The second ripple generation circuit includes a DC offset calibration circuit and a buffer circuit. The DC offset calibration circuit is configured to calibrate the reference voltage signal to eliminate an offset between the reference voltage signal and the feedback signal. The buffer circuit is coupled to the signal processing circuit and configured to buffer the DC signal to output a buffered DC signal. The buffered DC signal is related to the second ripple signal. The comparison circuit is coupled to the first ripple generation circuit and the buffer circuit. The comparison circuit is configured to compare the first ripple signal and the second ripple signal and configured to trigger an on-time generation circuit to control the power stage circuit to operate according to a preset off time when the second ripple signal continuously transcends the first ripple signal, so that the inductor current is increased.

Another aspect of present disclosure relates to a power convertor circuit configured to convert an input voltage signal to output an output voltage signal at a load terminal. The power convertor circuit includes a power stage circuit and a control circuit. The power stage circuit is configured to receive the input voltage signal and configured to output a phase voltage signal at a phase output terminal. The phase output terminal is coupled to the load terminal through an inductor. The control circuit is coupled to the power stage circuit, the phase output terminal and the load terminal. The control circuit is configured to generate a first ripple signal according to the phase voltage signal, generate a second ripple signal according to a direct current (DC) signal generated by processing the first ripple signal, a reference voltage signal and a feedback signal related to the output voltage signal, and control the power stage circuit to operate according to a preset off time when the second ripple signal continuously transcends the first ripple signal, so that an inductor current flowing through the inductor is increased. The control circuit includes a DC offset calibration circuit, and the DC offset calibration circuit is configured to calibrate the reference voltage signal, to eliminate an offset between the reference voltage signal and the feedback signal.

In sum, the first ripple signal and the second ripple signal generated by the control circuit can rapidly cross when the load fluctuates, in order to stabilize the output voltage signal quickly in comparison to the related arts. Also, the control circuit can utilize the DC offset calibration circuit to calibrate the reference voltage signal, eliminating the offset between the feedback signal and the reference voltage signal. Therefore, the power convertor circuit of the present disclosure has advantages of better ability to respond to the load fluctuation, better stability of the output voltage, eliminating the DC offset, etc.

BRIEF DESCRIPTION OF THE DRAWINGS

The present disclosure can be more fully understood by reading the following detailed description of the embodiment, with reference made to the accompanying drawings as follows.

DETAILED DESCRIPTION

The embodiments are described in detail below with reference to the appended drawings to better understand the aspects of the present application. However, the provided embodiments are not intended to limit the scope of the disclosure, and the description of the structural operation is not intended to limit the order in which they are performed. Any device that has been recombined by components and produces an equivalent function is within the scope covered by the disclosure.

The terms used in the entire specification and the scope of the patent application, unless otherwise specified, generally have the ordinary meaning of each term used in the field, the content disclosed herein, and the particular content.

As used herein, "coupled" and "connected" may be used to indicate that two or more elements physical or electrical contact with each other directly or indirectly, and may also be used to indicate that two or more elements cooperate or interact with each other.

Figure 1:
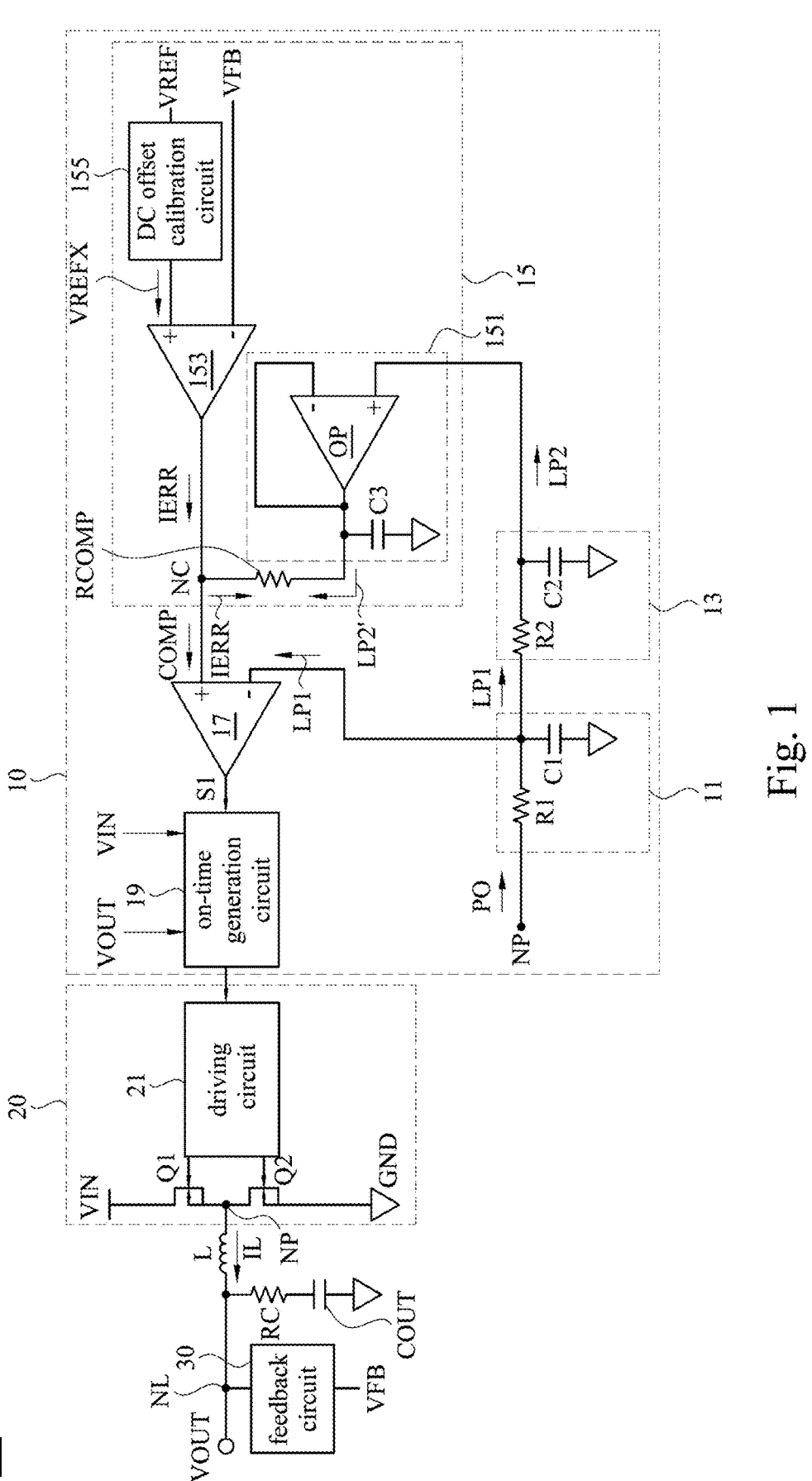
FIG. 1 is a schematic diagram of a power convertor circuit in accordance with some embodiments of the present disclosure.

Referring to FIG. 1, FIG. 1 is a schematic diagram of a power convertor circuit 100 in accordance with some embodiments of the present disclosure. In particular, the power convertor circuit 100 can be a DC/DC convertor such as a single-phase or multi-phase buck convertor, etc. In some embodiments, the power convertor circuit 100 is configured to convert an input voltage signal VIN to output an output voltage signal VOUT at a load terminal NL. For example, the power convertor circuit 100 can supply power to a load device (not shown) such as a central processing unit (CPU), etc., through the output voltage signal VOUT. It should be understood that the load device can be electrically coupled to the load terminal NL. In some embodiments, the power convertor circuit 100 includes a control circuit 10, a power stage circuit 20 and a feedback circuit 30.

In some embodiments, the power stage circuit 20 is configured to receive the input voltage signal VIN and a ground voltage GND. As shown in FIG. 1, the power stage circuit 20 includes a phase output terminal NP, a driving circuit 21, a high-side switch Q1 and a low-side switch Q2. The high-side switch Q1 is coupled between the input voltage signal VIN and the phase output terminal NP, and the low-side switch Q2 is coupled between the phase output terminal NP and the ground voltage GND. In other words, the hide-side switch Q1 and the low-side switch Q2 are connected in series between the input voltage signal VIN and the ground voltage GND. In particular, each of the hide-side switch Q1 and the low-side switch Q2 can be implemented with a transistor, but the present disclosure is not limited herein.

In some embodiments, the driving circuit 21 can be controlled by a control signal such as pulse width modulation (PWM) signal, etc., to drive the hide-side switch Q1 and the low-side switch Q2 to be alternatively turned on, so as to output a phase voltage signal PO at the phase output terminal NP. It should be understood that the phase voltage signal PO at the phase output terminal NP is a square wave voltage signal, and the voltage level of this square wave voltage signal can be switched between the voltage level of the input voltage signal VIN and the voltage level of the ground voltage GND.

As shown in FIG. 1, the phase output terminal NP of power stage circuit 20 is coupled to the load terminal NL through an inductor L. Also, a resistor RC and an output capacitor COUT are connected in series between the load terminal NL and the ground voltage GND, in which the resistor RC is an equivalent series resistance (ESR) of the output capacitor COUT. In particular, the inductor L, the resistor RC and the output capacitor COUT would compose a circuit (e.g., a low-pass filter circuit), and this circuit is configured to perform a signal processing (e.g., a low-pass filter processing) on the phase voltage signal PO so as to generate the output voltage signal VOUT at the load terminal NL.

It can be seen from the above descriptions that the phase voltage signal PO and the output voltage signal VOUT are at two terminals of the inductor L, respectively. In such configurations, an inductor current IL would flow through the inductor L. it should be understood that the inductor current IL flowing through the inductor L is a ripple signal.

In some practical applications, the aforementioned load device may be in a light load or heavy load state due to a temporary change of task (e.g., running a specific application and/or software). In comparison to being in the light load state, the load device in the heavy load state requires a large operating current immediately. When the load device is switched between the light load state and the heavy load state, overshoot or undershoot may occur in the output voltage signal VOUT correspondingly.

In order to maintain the stability of the output voltage signal VOUT, in some embodiments, the power convertor circuit 100 utilizes the control circuit 10 coupled between the load terminal NL and the power stage circuit 20 to decrease or eliminate the overshoot or the undershoot of the output voltage signal VOUT, which would be further described in following paragraphs.

In accordance with the above descriptions, as shown in FIG. 1, the control circuit 10 is coupled to the phase output terminal NP of the power stage circuit 20 and the driving circuit 21, and is coupled to the load terminal NL (or the output voltage signal VOUT) through the feedback circuit 30. In such configurations, the control circuit 10 can receive the phase voltage signal PO at the phase output terminal NP, a reference voltage signal VREF and a feedback signal VFB which is outputted by the feedback circuit 30 according to the output voltage signal VOUT.

In some further embodiments, the feedback circuit 30 is implemented with a buffer circuit, and therefore the feedback signal VFB can be substantially equal to the output voltage signal VOUT. In some further embodiments, the feedback circuit 20 is implemented with a voltage divider circuit, and therefore the feedback signal VFB can be substantially equal to the output voltage signal VOUT multiplied by a preset numerical value (e.g., any numerical value between 0 and 1). All in all, the feedback signal VFB can be changed with the output voltage signal VOUT, that is, the feedback signal VFB is related to the output voltage signal VOUT.

The circuit architecture of the control circuit 10 is then described with reference to FIG. 1. In some embodiments, the control circuit 10 includes a first ripple generation circuit 11, a signal processing circuit 13, a second ripple generation circuit 15, a comparison circuit 17 and an on-time generation circuit 19. The first ripple generation circuit 11 and the signal processing circuit 13 together can be regarded as a second order filter circuit.

In some further embodiments, the first ripple generation circuit 11 is a filter circuit (e.g., a low-pass filter circuit). As shown in FIG. 1, the first ripple generation circuit 11 includes a resistance element R1 and a capacitance element C1. The resistance element R1 includes a first terminal and a second terminal. The capacitance element C1 includes a first terminal and a second terminal. The first terminal of the resistance element R1 is coupled to the phase output terminal NP of the power stage circuit 20. The second terminal of the resistance element R1 is coupled to the comparison circuit 17 and the first terminal of the capacitance element C1. The second terminal of the capacitance element C1 is coupled to the ground voltage GND. It can be seen that the first ripple generation circuit 11 is coupled to the phase output terminal NP of the power stage circuit 20 and the comparison circuit 17.

In some further embodiments, the signal processing circuit 13 is a filter circuit (e.g., a low-pass filter circuit). As shown in FIG. 1, the signal processing circuit 13 includes a resistance element R2 and a capacitance element C2. The resistance element R2 includes a first terminal and a second terminal. The capacitance element C2 includes a first terminal and a second terminal. The first terminal of the resistance element R2 is coupled to the first ripple generation circuit 11. The second terminal of the resistance element R2 is coupled to the second ripple generation circuit 15 and the first terminal of the capacitance element C2. The second terminal of the capacitance element C2 is coupled to the ground voltage GND. It can be seen that the signal processing circuit 13 is coupled to the first ripple generation circuit 11 and the second ripple generation circuit 15.

In some further embodiments, the second ripple generation circuit 15 includes a buffer circuit 151, an error amplification circuit 153, a direct current (DC) offset calibration circuit 155 and a resistance element RCOMP.

The error amplification circuit 153 includes a positive input terminal (marked as "+" in FIG. 1), a negative input terminal (marked as "−" in FIG. 1) and an output terminal. The resistance element RCOMP includes a first terminal and a second terminal. The positive input terminal of the error amplification circuit 153 is coupled to the DC offset calibration circuit 155. The negative input terminal of the error amplification circuit 153 is coupled to the feedback circuit 30. The output terminal of the error amplification circuit 153 is coupled with the first terminal of the resistance element RCOMP and the comparison circuit 17 at a compensation node NC. The second terminal of the resistance element RCOMP is coupled to the buffer circuit 151. In particular, the error amplification circuit 153 can be implemented with a transconductance amplifier.

The buffer circuit 151 includes an operational amplifier OP and a capacitance element C3. The operational amplifier OP includes a positive input terminal (marked as "+" in FIG. 1), a negative input terminal (marked as "−" in FIG. 1) and an output terminal. The capacitance element C3 includes a first terminal and a second terminal. The positive input terminal of the operational amplifier OP is coupled to the signal processing circuit 13. The output terminal of the operational amplifier OP is coupled to the negative input terminal of the operational amplifier OP, the first terminal of the capacitance element C3 and the second terminal of the resistance element RCOMP. The second terminal of the capacitance element C3 is coupled to the ground voltage GND. It can be seen that the second ripple generation circuit 15 is coupled to the signal processing circuit 13, the comparison circuit 17 and the feedback circuit 30. The capacitance element C3 is configured to adjust the stability of a signal (e.g. a buffered DC signal LP2') coupled to the first terminal of the capacitance element C3, in some further embodiments, the capacitance element C3 in the buffer circuit 151 can be omitted.

In the configurations of FIG. 1, the buffer circuit 151 can be regarded as an in-phase voltage follower. In the configurations of this kind of the in-phase circuit, the output terminal of the operational amplifier OP is directly coupled to the negative input terminal of the operational amplifier OP (i.e., a negative feedback loop), and therefore the feedback ratio approximates 100%. The voltage level at the positive input terminal is substantially equal to the voltage level at the output terminal, that is, the gain of the buffer circuit 151 is substantially 1. Since the input impedance of the operational amplifier OP is infinite in the ideal condition, there is no current flowing through the negative feedback loop, and there is no current flowing into the positive input terminal. Therefore, a voltage drop across the positive input terminal and the negative input terminal of the operational amplifier OP approximates zero, which results in that the power consumption approximates zero. The buffer circuit 151 can stabilize the voltage level of the buffered DC signal LP2' outputted by itself in the voltage level of a DC signal LP2 received by itself, and has an effect of signal isolation, that is, the DC signal LP2 is not affected by elements or signal sources coupled to the buffer circuit 151.

In some further embodiments, the comparison circuit 17 includes a positive input terminal, a negative input terminal and an output terminal. The positive input terminal of the comparison circuit 17 is coupled with the second ripple generation circuit 15 at the compensation node NC. The negative input terminal of the comparison circuit 17 is coupled to the first ripple generation circuit 11. The output terminal of the comparison circuit 17 is coupled to the on-time generation circuit 19. Accordingly, the comparison circuit 17 is coupled to the first ripple generation circuit 11, the second ripple generation circuit 15 and the on-time generation circuit 19. In addition, the on-time generation circuit 19 is coupled to the driving circuit 21 of the power stage circuit 20.

Based on the circuit architecture of the control circuit 10, in some embodiments, the first ripple generation circuit 11 is configured to output a first ripple signal LP1 according to the phase voltage signal PO at the phase output terminal NP. For example, the first ripple generation circuit 11 filters the phase voltage signal PO to output the first ripple signal LP1. The signal processing circuit 13 is configured to process the first ripple signal LP1 to output the DC signal LP2. For example, the signal processing circuit 13 filters the first ripple signal LP1 to output the DC signal LP2.

The second ripple generation circuit 15 is configured to output a second ripple signal COMP according to the DC signal LP2, the reference voltage signal VREF and the feedback signal VFB. As shown in FIG. 1, the DC offset calibration circuit 155 is configured to calibrate the reference voltage signal VREF into a calibrated reference voltage signal VREFX, which would be further described in following paragraphs with reference to FIGS. 4A-4B and 5.

The error amplification circuit 153 is configured to convert a difference between the calibrated reference voltage signal VREFX and the feedback signal VFB into an error current signal IERR, and is configured to output the error current signal IERR to the compensation node NC. The buffer circuit 151 is configured to buffer the DC signal LP2 into the buffered DC signal LP2', and is configured to output the buffered DC signal LP2' to the second terminal of the resistance element RCOMP, in which the buffered DC signal LP2' is related to the second ripple signal COMP.

Because the comparison circuit 17 is implemented with the operational amplifier, the comparison circuit 17 normally does not allow any current to flow into the positive input terminal thereof. Therefore, as shown in FIG. 1, the error current signal IERR outputted by the error amplification circuit 153 would sequentially pass through the compensation node NC, the first terminal of the resistance element RCOMP and the second terminal of the resistance element RCOMP, which further results in that a voltage difference (not shown) is generated across the first terminal and the second terminal of the resistance element RCOMP. In such way, the second ripple generation circuit 15 can output the second ripple signal COMP according to the buffered DC signal LP2' and the voltage difference which is generated by the error current signal IERR and the resistance element RCOMP. For example, the second ripple signal COMP is generated by adding the buffered DC signal LP2' to the voltage difference between the first terminal and the second terminal of the resistance element RCOMP.

In the above embodiments, the buffered DC signal LP2' is substantially equal to the DC signal LP2. Therefore, the second ripple generation circuit 15 equivalently outputs the second ripple signal COMP according to the error current signal IERR and the DC signal LP2.

Then, the comparison circuit 17 is configured to compare the first ripple signal LP1 and the second ripple signal COMP, and is configured to control the on-time generation circuit 19 according to the comparison result of the first ripple signal LP1 and the second ripple signal COMP, which would be further described in detail below with reference to FIGS. 2-3.

The circuit operation of the control circuit 10 in load fluctuation (e.g., changing from the light load into the heavy load, changing from the heavy load into the light load, etc.) would be then described with reference to FIGS. 2 and 3. FIG. 2 is a timing diagram of the inductor current IL, the first ripple signal LP1, the DC signal LP2, the second ripple signal COMP and the output voltage signal VOUT in the power convertor circuit 100 when the output load is changed from the light load into the heavy load in accordance with some embodiments of the present disclosure. FIG. 3 is a timing diagram of the inductor current IL, the first ripple signal LP1, the DC signal LP2, the second ripple signal COMP and the output voltage signal VOUT in the power convertor circuit 100 when the output load is changed from the heavy load into the light load in accordance with some embodiments of the present disclosure.

Figure 2:
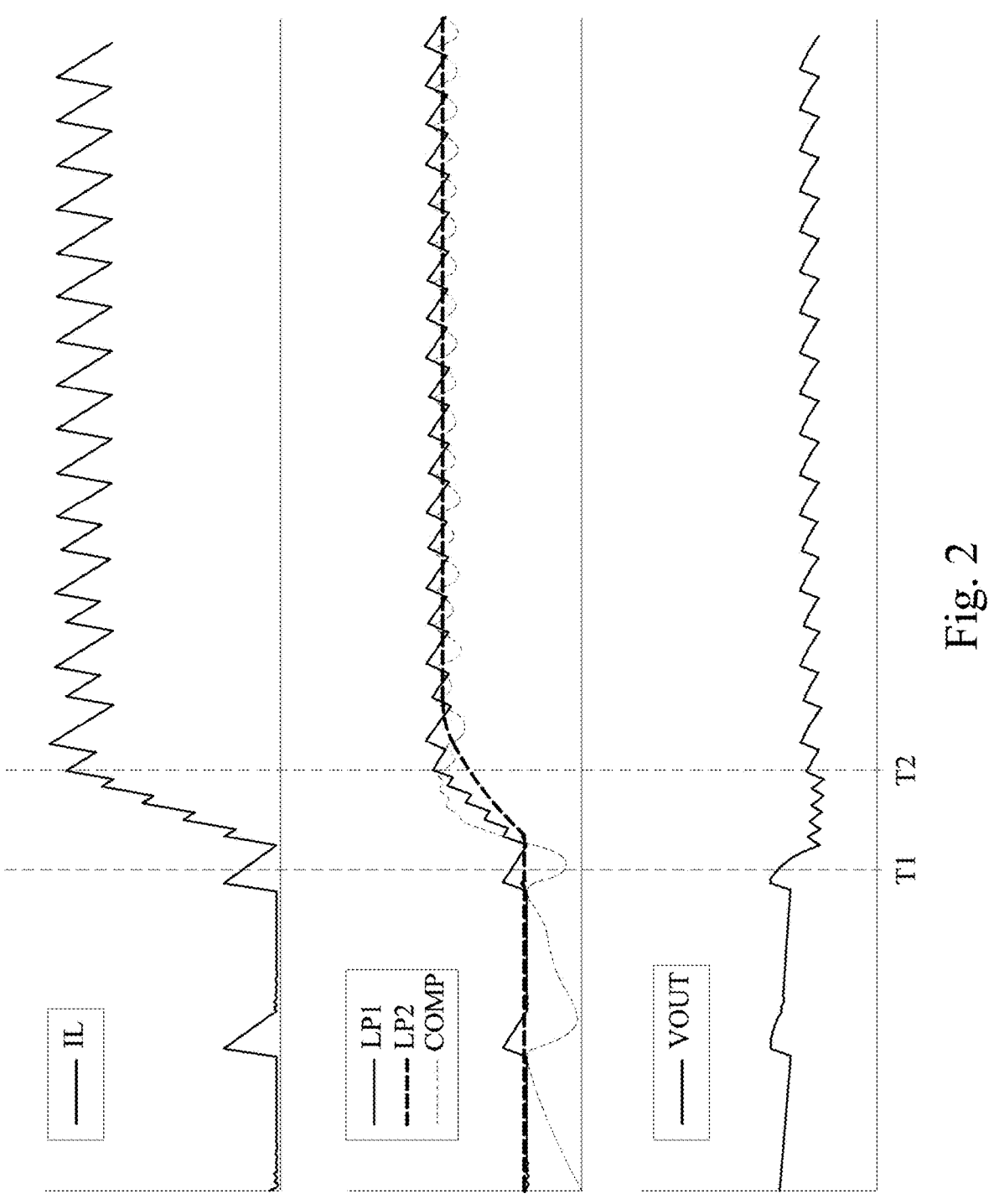
FIG. 2 is a timing diagram of some signals in the power convertor circuit in a condition that an output load is changed from a light load into a heavy load in accordance with some embodiments of the present disclosure.

In some embodiments, the output load is changed from the light load into the heavy load at a time point T1 as shown in FIG. 2, that is, the output load requires a large operating current. In this case, the power convertor circuit 100 is required to increase the magnitude of the inductor current IL to satisfy the requirement of the load device. However, the inductor current IL is unable to be immediately increased to the magnitude of the operating current required by the load device due to the characters of the inductor L. Therefore, the output capacitor COUT coupled to the load terminal NL would be discharged to compensate for the lack of the inductor current IL.

In accordance with the above descriptions, the discharge of the output capacitor COUT further results in the under-shoot of the output voltage signal VOUT. Therefore, as shown in FIG. 2, the output voltage signal VOUT is not maintained in the original periodic steady state from the time point T1 but is dramatically reduced, which may sequentially affect the feedback signal VFB related to the output voltage signal VOUT, the error current signal IERR outputted by the error amplification circuit 153 and the second ripple signal COMP outputted by the second ripple generation circuit 15. For example, the magnitude of the feedback signal VFB may be decreased following the reduction of the output voltage signal VOUT, the magnitude of the error current signal IERR may be increased due to the increase in the difference between the calibrated reference voltage signal VREFX and the feedback signal VFB, and the magnitude of the second ripple signal COMP may be increased following the increase in the error current signal IERR.

As shown in FIG. 2 again, following the increase in the magnitude of the second ripple signal COMP, the second ripple signal COMP transcends the first ripple signal LP1 after the time point T1, that is, the voltage level of the second ripple signal COMP exceeds or is greater than the voltage level of the first ripple signal LP1 after the time point T1. The term "transcend" used herein should be understood as a signal transforming from a level "lower than" a reference level into a level "higher than or equal to" the reference level, and can also be understood as "cross upwards".

In some embodiments, the comparison circuit 17 triggers the on-time generation circuit 19 to operate correspondingly when the second ripple signal COMP transcends the first ripple signal LP1. In particular, whenever the comparison circuit 17 is triggered by the aforementioned transcendence (for example, a control signal S1 outputted by the comparison circuit 17 is in a high level), the on-time generation circuit 19 would generate pulses accordingly. In opposition thereto, the on-time generation circuit 19 would not generate any pulse (i.e., the output thereof may be zero) when the comparison circuit 17 is not triggered in response to the aforementioned transcendence.

For example, the on-time generation circuit 19 can be a constant on-time pulse generator, which is configured to determine whether to output pulses according to the level of the output signal (i.e., the control signal S1) of the comparison circuit 17, and the frequency of the pulses can be determined by the output load. However, the time length of each pulse is fixed. Before the time point T1, that is, in the light load state where the current is steady outputted, the on-time generation circuit 19 outputs the pulses at an approximate fixed frequency. Then, in the heavy load state where a large current is required (e.g., during the period from the time point T1 to a time point T2), the second ripple signal COMP continuously transcends the first ripple signal LP1 from the time point T1 to the time point T2. In such way, the comparison circuit 17 continuously outputs the control signal S1 with the high level, so that the on-time generation circuit 19 generates continuous multiple pulses, that is, the on-time generation circuit 19 outputs the pulses at a frequency higher than the aforementioned fixed frequency. There is a preset off time between the time point of the end of each pulse and the time point of the start of a subsequent pulse, such as a minimum off time, which can decrease the undershoot of the output voltage signal VOUT to a maximum extent. As soon as the output voltage signal VOUT becomes steady (e.g., after the time point T2), the frequency of the pulses is decreased to a level required to maintain the steady output voltage signal VOUT. Therefore, in comparison to the existing arts, the on-time generation circuit 19 of the present disclosure is capable of providing better transient response.

In addition, there may be a variation in the input voltage signal VIN/the output voltage signal VOUT corresponding to each output pulse of the on-time generation circuit 19, and therefore an on-off frequency of the high-side switch Q1 and the low-side switch Q2 may be changed. In order to solve this problem, the constant on-time control is required to detect the input/output voltage and realize the constant on-off frequency when the input/output voltage is changed. In view of the aforementioned requirements, as shown in FIG. 1, the on-time generation circuit 19 can be designed to be coupled to the input voltage signal VIN and the output voltage signal VOUT and adjust a duty ratio of the output signal of the on-time generation circuit 19 according to the variations in the input voltage signal VIN and the output voltage signal VOUT, so as to keep the on-off frequency of the high-side switch Q1 and the low-side switch Q2 fixed, however, the present disclosure is not limited hereto. For example, in some embodiments, the on-time generation circuit 19 can be not coupled to the input voltage signal VIN or the output voltage signal VOUT.

Figure 3:
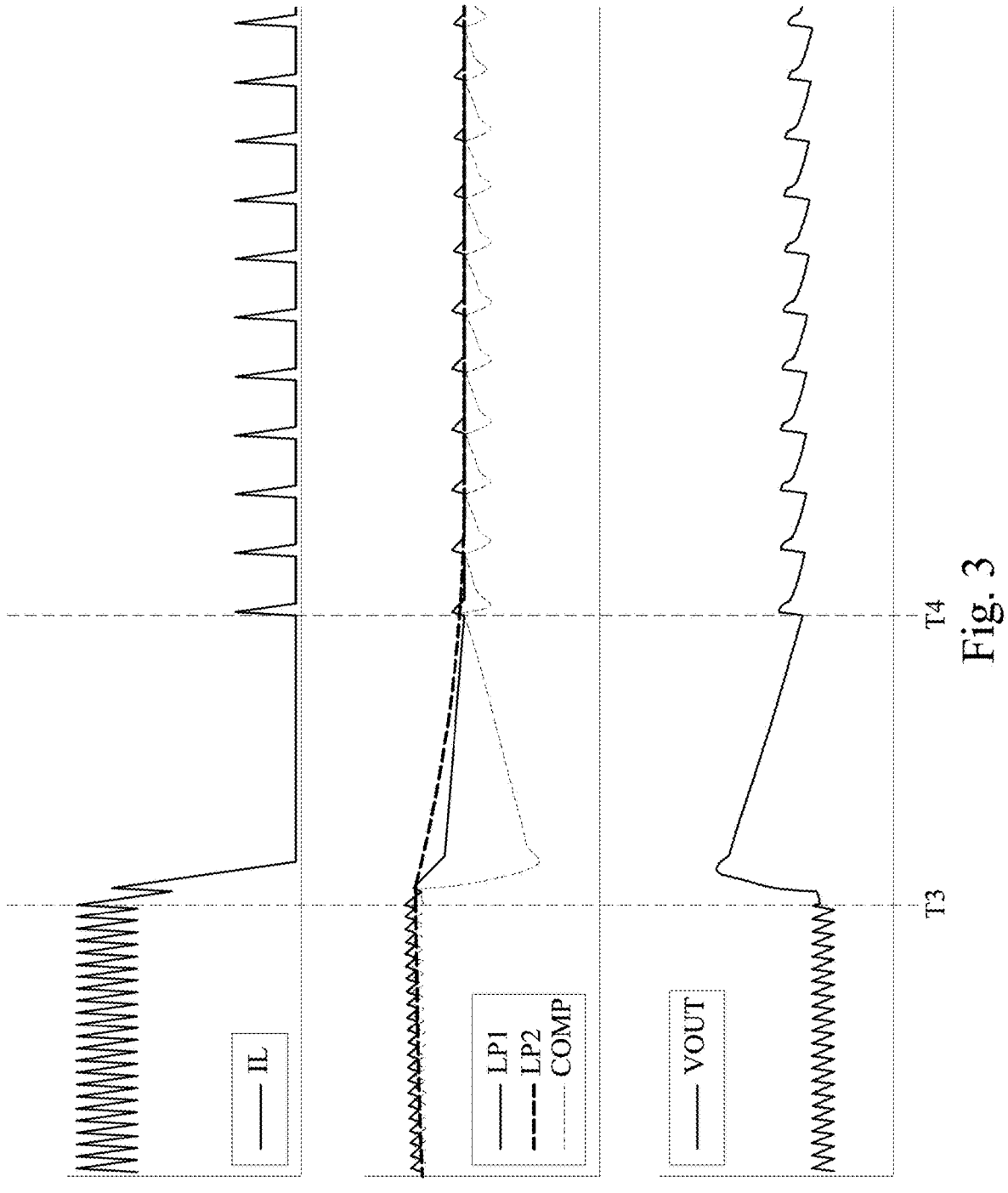
FIG. 3 is a timing diagram of some signals in the power convertor circuit in a condition that the output load is changed from the heavy load into the light load in accordance with some embodiments of the present disclosure.

In some embodiments, as shown in FIG. 3, the output load is changed from the heavy load into the light load before a time point T3 which is presented after the time point T2, that is, the power convertor circuit 100 enters an extraction mode, and the output load does not require the large operating current any longer. In this case, the power convertor circuit 100 is required to decrease the magnitude of the inductor current IL to satisfy the requirement of the load device. However, the inductor current IL is also unable to be immediately decreased to the magnitude of the operating current required by the load device due to the characters of the inductor L. Therefore, the output capacitor COUT coupled to the load terminal NL would be charged by the excess part of the inductor current IL.

In accordance with the above descriptions, the charge of the output capacitor COUT further results in the overshoot of the output voltage signal VOUT. Therefore, as shown in FIG. 3, the output voltage signal VOUT is significantly raised from the time point T3, which again sequentially affects the feedback signal VFB related to the output voltage signal VOUT, the error current signal IERR outputted by the error amplification circuit 153 and the second ripple signal COMP outputted by the second ripple generation circuit 15. For example, the magnitude of the feedback signal VFB may be increased following the rise in the output voltage signal VOUT, so that the magnitude of the error current signal IERR may be decreased due to the reduction in the difference between the calibrated reference voltage signal VREFX and the feedback signal VFB, and the magnitude of the second ripple signal COMP may be decreased following the reduction in the error current signal IERR.

As shown in FIG. 3 again, following the decrease in the magnitude of the second ripple signal COMP, the second ripple signal COMP continues to not transcend the first ripple signal LP1 during the period between the time point T3 and a time point T4, and the comparison circuit 17 stops triggering the on-time generation circuit 19 during this period. In other words, when the aforementioned transcendence does not occur, the comparison circuit 17 continuously outputs the control signal S1 with the low level, so as to control the on-time generation circuit 19 not to generate the pulses. As shown in FIG. 3, the inductor current IL flowing through the inductor L is gradually decreased after the time point T3, and the output voltage signal VOUT at the load terminal NL becomes steady after the time point T3.

It can be seen from the descriptions of the embodiments of FIGS. 2-3 that the control circuit 10 is configured to generate the first ripple signal LP1 according to the phase voltage signal PO, and is configured to generate the second ripple signal COMP according to the DC signal LP2 generated by processing the first ripple signal LP1, the reference voltage signal VREF and the feedback signal VFB related to the output voltage signal VOUT. When the load device enters the heavy load state, the control circuit 10 is configured to control the power stage circuit 20 to operate according to the minimum off time (at this time, the turned-on frequency of the high-side switch Q1 is increased, and the time interval between each two adjacent turned-on events is the minimum off time) through the on-time generation circuit 19 by utilizing the second ripple signal COMP continuously transcending the first ripple signal LP1 (e.g., between the time point T1 and the time point T2), so that the inductor current IL flowing through the inductor L is increased to adapt to the condition in which the output load is changed from the light load into the heavy load. Also, when the load device enters the light load state, the control circuit 10 is configured to control the power stage circuit 20 to turn off the high-side switch Q1 through the on-time generation circuit 19 by the second ripple signal COMP continuing to not transcend the first ripple signal LP1, so that the inductor current IL flowing through the inductor L is rapidly reduced to adapt to the condition in which the output load is changed from the heavy load into the light load.

As shown in FIGS. 2-3 again, both the first ripple signal LP1 which is generated by the first ripple generation circuit 11 through filtering the phase voltage signal PO and the inductor current IL which flows through the inductor L are similar in change of the waveforms thereof. That is to say, the first ripple signal LP1 is related to the inductor current IL.

In addition, the DC signal LP2 is related to a DC component of the output voltage signal VOUT. Furthermore, the DC signal LP2 is equivalently generated by the first ripple generation circuit 11 and the signal processing circuit 13 through filtering the phase voltage signal PO twice, and therefore the DC signal LP2 would approximate to the DC component of the output voltage signal VOUT. Also, it can be seen from the descriptions of the second ripple signal COMP that the second ripple signal COMP is equivalent to a signal which is varied between an upper limit and a lower limit with the error current signal IERR and based on the DC signal LP2.

Notably, the first ripple signal LP1 and the second ripple signal COMP generated by the control circuit 10 can rapidly cross (that is, the second ripple signal COMP transcends the first ripple signal LP1, or the first ripple signal LP1 transcends the second ripple signal COMP) when the load fluctuates, in order to stabilize the output voltage signal VOUT more quickly in comparison to the related arts. Therefore, the power convertor circuit 100 of the present disclosure has advantages of better ability to respond to the load fluctuation, better stability of the output voltage, etc.

Figure 4B:
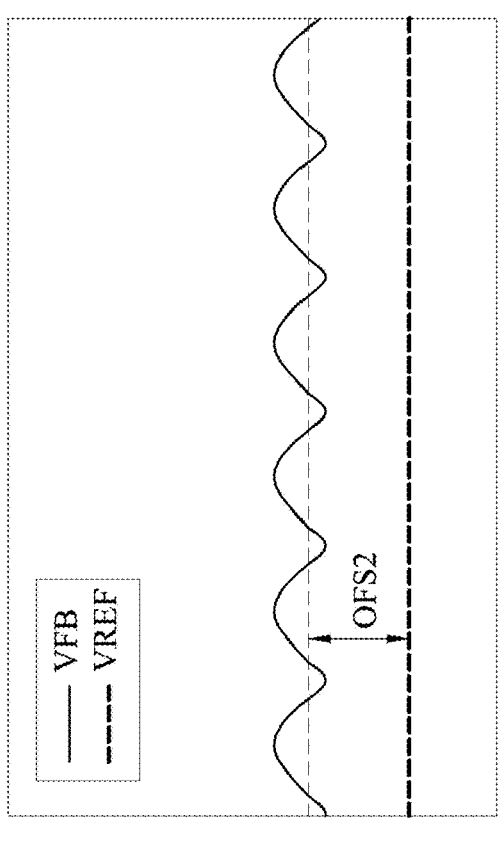
FIG. 4B is a schematic diagram showing a feedback signal and a reference voltage signal in accordance with some embodiments of the present disclosure.
Figure 4A:
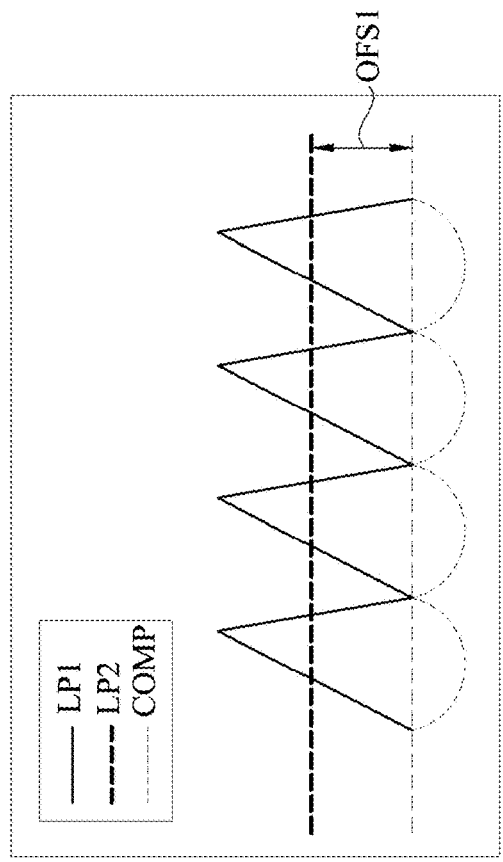
FIG. 4A is a schematic diagram showing a direct current (DC) signal, a first ripple signal and a second ripple signal in accordance with some embodiments of the present disclosure.

The reason for arranging the DC offset calibration circuit 155 in the power convertor circuit 100 would be described herein with reference to FIGS. 4A-4B. FIG. 4A is a schematic diagram showing the DC signal LP2, the first ripple signal LP1 and the second ripple signal COMP in accordance with some embodiments of the present disclosure. FIG. 4B is a schematic diagram showing the feedback signal VFB and the reference voltage signal VREF in accordance with some embodiments of the present disclosure.

In some embodiments, as shown in FIGS. 4A-4B, because the comparison circuit 17 in the control circuit 10 compares the first ripple signal LP1 and the second ripple signal COMP instead of the first ripple signal LP1 and the DC signal LP2, an offset OFS1 between the DC signal LP2 and the second ripple signal COMP would result in an offset OFS2 between the feedback signal VFB and the reference voltage signal VREF after passing through at least the power stage circuit 20 and the feedback circuit 30. Notably, the power convertor circuit 100 can utilize the DC offset calibration circuit 155 to eliminate this offset OFS2, which would be described in detail below with reference to FIG. 5.

Figure 5:
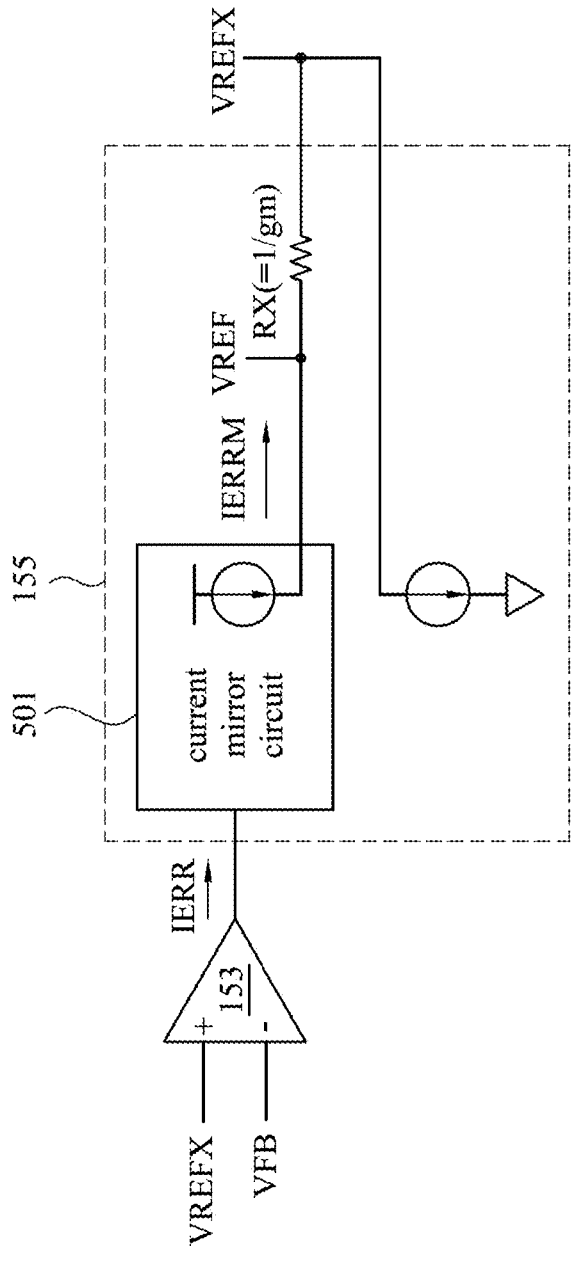
FIG. 5 is a schematic diagram of a DC offset calibration circuit in accordance with some embodiments of the present disclosure.

Referring to FIG. 5, FIG. 5 is a schematic diagram of the DC offset calibration circuit 155 in accordance with some embodiments of the present disclosure. In some embodiments, a design of the error current signal IERR divided by a gain gm of the error amplification circuit 153 can be used to be equivalent to the offset OFS2 in FIG. 4B. Accordingly, the DC offset calibration circuit 155 is set to calibrate the reference voltage signal VREF according to the error current signal IERR and the gain gm of the error amplification circuit 153, to output the calibrated reference voltage signal VREFX.

As shown in FIG. 5, the DC offset calibration circuit 155 includes a current mirror circuit 501 and a resistance element RX. The resistance element RX includes a first terminal and a second terminal. The first terminal of the resistance element RX is coupled to the reference voltage signal VREF. The current mirror circuit 501 is coupled to the first terminal of the resistance element RX and the error amplification circuit 153. In particular, the resistance of the resistance element RX is set to be a reciprocal form of the gain gm, that is, the resistance of the resistance element RX and the gain gm of the error amplification circuit 153 are related.

In some embodiments, the current mirror circuit 501 is configured to duplicate the error current signal IERR generated by the error amplification circuit 153 to output a duplicate current signal IERRM to the first terminal of the resistance element RX. The duplicate current signal IERRM would sequentially pass through the first terminal of the resistance element RX and the second terminal of the resistance element RX, which further results in that a voltage difference (not shown) is generated across the first terminal and the second terminal of the resistance element RX. It should be understood that the voltage difference between the first terminal and the second terminal of the resistance element RX is substantially the duplicate current signal IERRM multiplied by the reciprocal form of the gain gm, which is equivalent to the error current signal IERR divided by the gain gm (i.e., the offset OFS2). Then, the DC offset calibration circuit 155 can subtract the voltage difference between the first terminal and the second terminal of the resistance element RX from the reference voltage signal VREF, to output the calibrated reference voltage signal VREFX at the second terminal of the resistance element RX.

It can be seen that there is substantially no offset between the calibrated reference voltage signal VREFX and the feedback signal VFB, and therefore replacing the reference voltage signal VREF with the calibrated reference voltage signal VREFX is equivalent to that the DC offset calibration circuit 155 eliminates the offset OFS2 between the feedback signal VFB and the reference voltage signal VREF.

In should be understood that the control circuit 10 of the present disclosure is not limited to the circuit architecture as shown in FIG. 1. For example, the on-time generation circuit 19 can be independent from the control circuit 10. In some embodiments, the on-time generation circuit 19 is externally connected to the control circuit 10.

In should be also understood that the DC offset calibration circuit 155 of the present disclosure is not limited to the circuit architecture as shown in FIG. 5. For example, in some embodiments, the DC offset calibration circuit 155 can obtain the offset OFS1 between the DC signal LP2 and the second ripple signal COMP, multiplies the offset OFS1 by a preset ratio parameter to calculate a calibration value, and calibrates the reference voltage signal VREF to the calibrated reference voltage signal VREFX using the calibration value, which also can achieve the purpose for calibrating the DC offset. All in all, any circuit architecture capable of eliminating the offset OFS2 between the feedback signal VFB and the reference voltage signal VREF can be used to implement the DC offset calibration circuit 155 of the present disclosure.

Although the present disclosure has been described in considerable detail with reference to certain embodiments thereof, other embodiments are possible. Therefore, the spirit and scope of the appended claims should not be limited to the description of the embodiments contained herein. It will be apparent to those skilled in the art that various modifications and variations can be made to the structure of the present disclosure without departing from the scope or spirit of the invention. In view of the foregoing, it is intended that the present invention cover modifications and variations of this invention provided they fall within the scope of the following claims.

What is claimed is:

1. A control circuit, applicable to a power convertor circuit, wherein the power convertor circuit comprises a power stage circuit and is configured to output an inductor current through an inductor, and the control circuit comprises:

a first ripple generation circuit, coupled to a phase output terminal of the power stage circuit, and configured to output a first ripple signal according to a phase voltage signal outputted by the power stage circuit;

a signal processing circuit, coupled to the first ripple generation circuit, and configured to process the first ripple signal to output a direct current (DC) signal;

a second ripple generation circuit, coupled to the signal processing circuit, and configured to output a second ripple signal according to the DC signal, a reference voltage signal and a feedback signal related to an output voltage signal of the power convertor circuit, wherein the second ripple generation circuit comprises:

a DC offset calibration circuit, configured to calibrate the reference voltage signal to eliminate an offset between the reference voltage signal and the feedback signal; and a buffer circuit, coupled to the signal processing circuit, and configured to buffer the DC signal to output a buffered DC signal, wherein the buffered DC signal is related to the second ripple signal; and a comparison circuit, coupled to the first ripple generation circuit and the buffer circuit, configured to compare the first ripple signal and the second ripple signal, and configured to trigger an on-time generation circuit to control the power stage circuit to operate according to a preset off time when the second ripple signal continuously transcends the first ripple signal, so that the inductor current is increased.

2. The control circuit of claim 1, wherein the first ripple generation circuit is a filter circuit, and the filter circuit is configured to filter the phase voltage signal to output the first ripple signal, and wherein the first ripple signal is related to the inductor current.

3. The control circuit of claim 1, wherein the first ripple generation circuit comprises:

a resistance element, comprising a first terminal coupled to the phase output terminal and a second terminal coupled to a negative input terminal of the comparison circuit; and a capacitance element, comprising a first terminal coupled to the second terminal of the resistance element and a second terminal coupled to a ground voltage.

4. The control circuit of claim 1, wherein the signal processing circuit is a filter circuit, and the filter circuit is configured to filter the first ripple signal to output the DC signal, wherein the DC signal is related to a DC component of the output voltage signal.

5. The control circuit of claim 1, wherein the signal processing circuit comprises:

a resistance element, comprising a first terminal coupled to the first ripple generation circuit and a second terminal coupled to the second ripple generation circuit; and a capacitance element, comprising a first terminal coupled to the second terminal of the resistance element and a second terminal coupled to a ground voltage.

6. The control circuit of claim 1, wherein the second ripple generation circuit further comprises:

an error amplification circuit, comprising a positive input terminal configured to receive a calibrated reference voltage signal outputted by the DC offset calibration circuit and a negative input terminal configured to receive the feedback signal, and configured to convert a difference between the calibrated reference voltage signal and the feedback signal to output an error current signal to a compensation node, wherein the second ripple generation circuit is configured to output the second ripple signal according to the error current signal and the buffered DC signal.

7. The control circuit of claim 6, wherein the second ripple generation circuit further comprises:

a resistance element, comprising a first terminal and a second terminal, wherein the first terminal is coupled to the compensation node, and the second terminal is coupled to the buffer circuit to receive the buffered DC signal outputted by the buffer circuit, wherein the second ripple generation circuit is configured to output the second ripple signal according to the buffered DC signal and a voltage difference generated by the error current signal and the resistance element.

8. The control circuit of claim 6, wherein the DC offset calibration circuit is configured to calibrate the reference voltage signal according to the error current signal and a gain of the error amplification circuit, to output the calibrated reference voltage signal.

9. The control circuit of claim 6, wherein the DC offset calibration circuit comprises:

a resistance element, comprising a first terminal and a second terminal, wherein the first terminal is coupled to the reference voltage signal, wherein a resistance of the resistance element is related to a gain of the error amplification circuit; and a current mirror circuit, coupled to the first terminal of the resistance element and the error amplification circuit, and configured to duplicate the error current signal to output a duplicate current signal to the first terminal of the resistance element, wherein the DC offset calibration circuit is configured to output the calibrated reference voltage signal at the second terminal of the resistance element by allowing the duplicate current signal to pass through the resistance element.

10. The control circuit of claim 1, wherein the second ripple generation circuit is coupled to the output voltage signal through a feedback circuit, and the feedback circuit is configured to output the feedback signal according to the output voltage signal.

11. A power convertor circuit, configured to convert an input voltage signal to output an output voltage signal at a load terminal, and comprising:

a power stage circuit, configured to receive the input voltage signal, and configured to output a phase voltage signal at a phase output terminal, wherein the phase output terminal is coupled to the load terminal through an inductor; and a control circuit, coupled to the power stage circuit, the phase output terminal and the load terminal, configured to generate a first ripple signal according to the phase voltage signal, configured to generate a second ripple signal according to a direct current (DC) signal generated by processing the first ripple signal, a reference voltage signal and a feedback signal related to the output voltage signal, and configured to control the power stage circuit to operate according to a preset off time when the second ripple signal continuously transcends the first ripple signal, so that an inductor current flowing through the inductor is increased, wherein the control circuit comprises a DC offset calibration circuit, and the DC offset calibration circuit is configured to calibrate the reference voltage signal, to eliminate an offset between the reference voltage signal and the feedback signal, wherein the control circuit further comprises:

a first ripple generation circuit, coupled to the phase output terminal, and configured to filter the phase voltage signal to output the first ripple signal;

a signal processing circuit, coupled to the first ripple generation circuit, and configured to process the first ripple signal to output the DC signal;

a second ripple generation circuit, coupled to the signal processing circuit, and configured to output the second ripple signal according to the DC signal, the reference voltage signal and the feedback signal, wherein the second ripple generation circuit comprises:

the DC offset calibration circuit; and a buffer circuit, coupled to the signal processing circuit, configured to buffer the DC signal to output a buffered DC signal, wherein the buffered DC signal is related to the second ripple signal; and a comparison circuit, coupled to the first ripple generation circuit and the second ripple generation circuit, and configured to compare the first ripple signal and the second ripple signal; and an on-time generation circuit, coupled to the comparison circuit and the power stage circuit, and configured to be triggered by the comparison circuit to control the power stage circuit to operate according to a minimum off time when the second ripple signal continuously transcends the first ripple signal.

12. The power convertor circuit of claim 11, wherein the first ripple generation circuit comprises:

a resistance element, comprising a first terminal coupled to the phase output terminal and a second terminal coupled to a negative input terminal of the comparison circuit; and a capacitance element, comprising a first terminal coupled to the second terminal of the resistance element and a second terminal coupled to a ground voltage.

13. The power convertor circuit of claim 11, wherein the signal processing circuit comprises:

a resistance element, comprising a first terminal coupled to the first ripple generation circuit and a second terminal coupled to the second ripple generation circuit; and a capacitance element, comprising a first terminal coupled to the second terminal of the resistance element and a second terminal coupled to a ground voltage.

14. The power convertor circuit of claim 11, wherein the second ripple generation circuit further comprises:

an error amplification circuit, comprising a positive input terminal configured to receive a calibrated reference voltage signal outputted by the DC offset calibration circuit and a negative input terminal configured to receive the feedback signal, and configured to convert a difference between the calibrated reference voltage signal and the feedback signal to output an error current signal to a compensation node, wherein the second ripple generation circuit is configured to output the second ripple signal according to the error current signal and the buffered DC signal.

15. The power convertor circuit of claim 14, wherein the second ripple generation circuit further comprises:

a resistance element, comprising a first terminal and a second terminal, wherein the first terminal is coupled to the compensation node, and the second terminal is coupled to the buffer circuit to receive the buffered DC signal outputted by the buffer circuit, wherein the second ripple generation circuit is configured to output the second ripple signal according to a voltage difference generated by the error current signal and the resistance element and the buffered DC signal.

16. The power convertor circuit of claim 14, wherein the DC offset calibration circuit is configured to calibrate the reference voltage signal according to the error current signal and a gain of the error amplification circuit, to output the calibrated reference voltage signal.

17. The power convertor circuit of claim 14, wherein the DC offset calibration circuit comprises:

a resistance element, comprising a first terminal and a second terminal, wherein the first terminal is coupled to the reference voltage signal, wherein a resistance of the resistance element is related to a gain of the error amplification circuit; and a current mirror circuit, coupled to the first terminal of the resistance element and the error amplification circuit, and configured to duplicate the error current signal to output a duplicate current signal to the first terminal of the resistance element, wherein the DC offset calibration circuit is configured to output the calibrated reference voltage signal at the second terminal of the resistance element by allowing the duplicate current signal to pass through the resistance element.

18. The power convertor circuit of claim 11, further comprising:

a feedback circuit, coupled to the load terminal and the control circuit, and configured to output the feedback signal to the control circuit according to the output voltage signal.

19. The power convertor circuit of claim 11, wherein the first ripple signal is related to the inductor current, and the DC signal is related to a DC component of the output voltage signal.

* * * * *